G. H. ANTHONY.
DIRIGIBLE HEADLAMP.
APPLICATION FILED SEPT. 10, 1921.
1,412,911.
Patented Apr. 18, 1922.
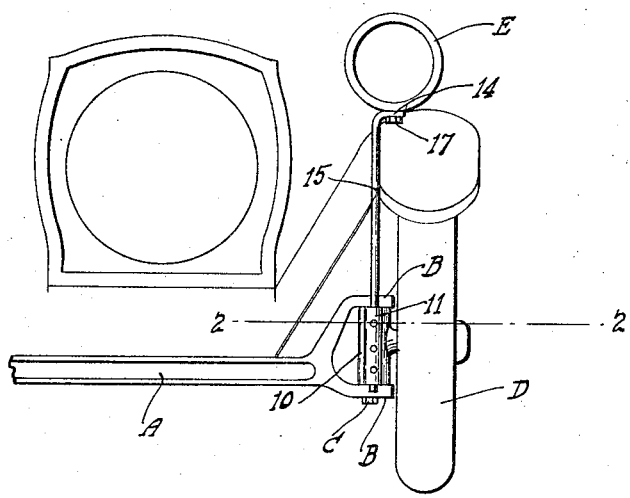
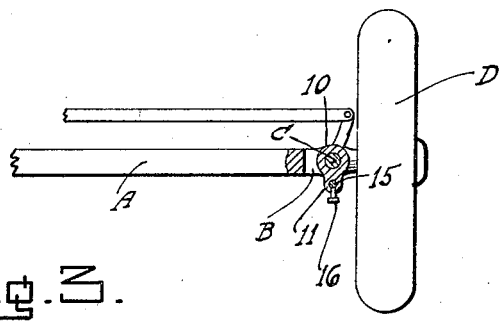
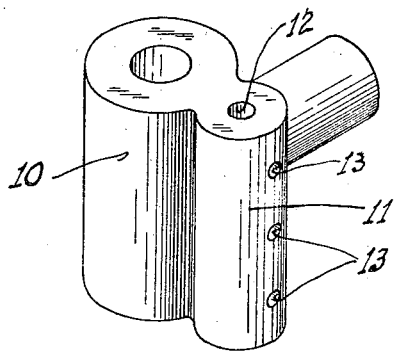
Inventor
George H. Anthony
By Watson E. Coleman, Attorney

UNITED STATES PATENT OFFICE.

GEORGE H. ANTHONY, OF SYKESVILLE, PENNSYLVANIA.

DIRIGIBLE HEADLAMP.

1,412,911.    Specification of Letters Patent.    Patented Apr. 18, 1922.

Application filed September 10, 1921. Serial No. 499,636.

*To all whom it may concern:*

Be it known that I, GEORGE H. ANTHONY, a citizen of the United States, residing at Sykesville, in the county of Jefferson and State of Pennsylvania, have invented certain new and useful Improvements in Dirigible Headlamps, of which the following is a specification, reference being had to the accompanying drawings.

This invention relates to head lamps for automobiles and has for its object the provision of a novel head lamp mounting whereby the head lamps will be caused to turn in accordance with the turning of the front wheels of the vehicle during steering so that the light will be thrown upon the road in advance of the vehicle regardless of whether the road be straight or curved so that the operator may at all times see clearly the path he is to follow.

An important and more specific object is the provision of a head lamp mounting which is carried directly by the steering spindle body so that there will be a positive connection which will insure proper turning movement of the lamps as the wheels are turned, this structure furthermore eliminating the use of any relatively movable parts which might cause rattling.

Another object is the provision of a mounting of this character in which the support proper for the head lamp may be adjusted with respect to the steering spindle body upon which it is mounted so that the head lamps might be caused to toe in or out as might be preferred and so as to compensate for any non-alignment of the front wheels.

An additional object is the provision of a mounting of this character which will be very simple and inexpensive in construction, easy to install, strong and durable in service and a general improvement in the art.

With the above and other objects and advantages in view, the invention consists in the details of construction to be hereinafter more fully described and claimed, and illustrated in the accompanying drawings, in which:

Figure 1 is a front elevation of a portion of an automobile showing the head lamp mounted thereon in accordance with my invention;

Figure 2 is a horizontal sectional view on the line 2—2 of Figure 1; and

Figure 3 is a detail perspective view of the steering spindle body removed.

Referring more particularly to the drawings, the letter A designates the front axle of an automobile having the usual forked end which provides upper and lower ears B between which is journaled, as by a spindle bolt C, the spindle body from which projects the spindle upon which the front axle D rotates.

In carrying out my invention I provide a spindle body which is of slightly different construction from that ordinarily provided. I have shown the spindle body 10 as provided upon one side with a sleeve or tubular socket 11 which is cast integrally with the spindle body 10 and which is formed with a vertically extending bore 12 and a plurality of threaded holes 13 leading there into.

The head lamps E instead of being mounted rigidly upon the fenders, the brace rods which connect the fenders with the frame or upon any other similar location, are each secured upon the laterally extending end 14 formed on a vertical rod 15 which fits within the sleeve or socket 11 and which is held in position therein by suitable set screws 16 which are threaded through the holes 13. The lateral extension 14 on the rod 15 is preferably flattened out and is provided with a hole through which passes the lamp standard. It is of course to be understood that the ordinary lamp standard may be eliminated and that the lamp may be secured directly upon the ear or extension 14 by means of a suitable bolt 17.

In the operation of the device it will be seen that as the vehicle is steered in one direction or the other the spindle bodies 10 will of course rotate as they are provided with the usual arms connected with the steering mechanism. As the spindle bodies are turned it is of course apparent that each rod 15 will be correspondingly turned and this will result in movement of the head lamps in exact accordance with the movement of the front wheels. If for any reason it should be desired to make the head lamps toe in or out, such may be easily accomplished by loosening the set screws 16 and turning the rod 15 so as to bring the head lamp at the desired position. This adjustment also provides means for compensating for any lack of alignment of the front wheels with the rear wheels so that the exact manner in which the rays of light from the lamps are projected may be readily controlled.

From the foregoing description and a study on the drawings it will be apparent that I have thus provided an extremely simple mounting for head lamps whereby the same will automatically turn to illuminate the road in advance of the vehicle regardless of whether the road be straight or curved, the device consequently operating to prevent accidents and to facilitate in driving. Another feature or advantage of my specific mounting is that the sleeve or socket does not in any way weaken the spindle body but actually serves to strengthen it so that the entire structure will be very rigid. Owing to the eliminating of elaborate connections often provided in mountings for an equivalent purpose, it will be apparent that there is nothing to rattle.

While I have shown and described the preferred embodiment of the invention, it is of course to be readily understood that I reserve the right to make such changes in the form, construction and arrangement of parts as will not depart from the spirit of the invention or the scope of the sub-joined claims.

Having thus described my invention, I claim:

1. A dirigible head lamp mounting for motor vehicles comprising the combination with the steering spindle bodies at the ends of the front axle, of socket members carried by said bodies, vertically extending rods secured within said socket members and carrying the lamps, and set screws threaded into said sockets and engaging the rods, the rods being rotatably mounted and longitudinally adjustable within said sockets.

2. A dirigible head lamp mounting for automobiles comprising the combination with the steering spindle bodies, of vertically extending socket members formed integrally upon said bodies, and a vertically extending rod slidably and rotatably adjustably mounted within each socket and carrying the head lamp.

In testimony whereof I hereunto affix my signature.

GEO. H. ANTHONY.